3,157,697
1-(2,2-DIHALOCYCLOPROPYL) AROMATIC
CARBOXYLIC ACIDS
Joseph M. Sandri and Ellis K. Fields, Chicago, Ill., assignors to Standard Oil Company, Chicago, Ill., a corporation of Indiana
No Drawing. Filed Oct. 30, 1959, Ser. No. 849,752
4 Claims. (Cl. 260—515)

This invention relates to a novel class of substituted aromatic carboxylic acids, those having a 2,2-dihalocyclopropyl group attached to a carbon atom of an aromatic ring. This invention also relates to the preparation of these novel acids.

We have discovered a new class of aromatic carboxylic acids, the 1-(2,2-dihalocyclopropyl) aromatic carboxylic acids. The simplest member of this new class of aromatic carboxylic acids is, of course, a 1-(2,2-dihalocyclopropyl) benzoic acid having the formula:

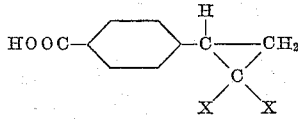

wherein X is chlorine or bromine. Generically speaking, the new carboxylic acids of this invention contain a 2,2-dihalocyclopropyl group attached to a nuclear carbon of an aromatic ring to which there is also attached one or more carboxylic groups to different nuclear carbon atoms of the aromatic ring. These compounds may contain one aromatic ring as in benzene ring, two or more rings joined as in biphenyl, terphenyl or quaterphenyl structures or two or more fused rings as in naphthalene, anthracene, phenanthrene, chrysene and the like. They may contain one carboxylic acid group as in 1-(2,2-dihalocyclopropyl)-benzoic acids, -tertiary-butylbenzoic acids, -naphthoic acids, -biphenyl monocarboxylic acid and the like, or they may contain 2 or more carboxylic acid groups as in 1-(2,2-dihalocyclopropyl)-o, m, and p-phthalic acids, -naphthalene di- and tri-carboxylic acids, -biphenyl di- and tri-carboxylic acids and the like. They may also contain two or more 1-(2,2-dihalocyclopropyl) groups as in bis-[1-(2,2-dihalocyclopropyl]) - benzoic acids, -benzenedicarboxylic acids, -naphthoic acid, -naphthalic acid, -biphenyl 4,4'-dicarzboxylic acid and the like. They may also contain the 2,2-dichloro- or 2,2-dibromo-1-methylcyclopropyl groups.

These 1-(2,2-dihalocyclopropyl) aromatic carboxylic acids are prepared by the liquid phase oxidation of 1-(alkyl substituted aryl)-2,2-dihalocyclopropanes with molecular oxygen in the presence of a catalyst system comprising a source of bromine and a heavy metal oxidation catalyst. Since the acid products as well as many of the oxidizable feed stocks are solids at room temperature, it is preferred to employ an inert reaction solvent such as benzene, benzoic acid, or a lower aliphatic monocarboxylic acid such as those containing 2 to 8 carbon atoms. Of these aliphatic monocarboxylic acids, acetic acid is preferred. The inert reaction solvent is employed in the range of 5 to 95% by weight based on the feed stock to be oxidized.

The oxidation process is carried out at a temperature of at least the oxidation threshold for the particular compound being oxidized and the source of molecular oxygen. When commercial or even substantially pure oxygen is employed as the source of molecular oxygen to oxidize methyl groups, the oxidation threshold temperature appears to be 50 to 60° C. When air is the source of molecular oxygen, the threshold oxidation temperature for methyl groups appears to be 100 to 120° C. By threshold oxidation temperature is meant, that temperature at which oxidation first takes place. At the oxidation threshold temperature the reaction is slow. The oxidation reaction increases in rate as the temperature increases. It is preferred for convenience to employ reaction temperatures above 120° C. up to 300° C. Since the process is a liquid phase oxidation, sufficient pressure must be employed to maintain at least a portion of the reaction mixture in the liquid phase. The minimum pressure will depend upon the oxidation temperature and the vapor pressures of the feed stock to be oxidized and/or the reaction solvent. The oxidation process can be conveniently carried out at pressures from atmospheric pressure to 1500 p.s.i.g. and above.

The feed stocks for the preparation of the novel aromatic acids of this invention can be readily prepared by reacting an alkyl substituted aromatic vinyl compound such as an alkyl substituted styrene, an alkyl substituted α-methyl styrene, an ar-alkyl substituted divinylbenzene, an ar-alkyl substituted mono- or di-vinyl biphenyl, an ar-alkyl substituted mono- or di-vinyl naphthalene and the like with dichloro- or dibromo-carbenes formed in situ by the alkaline hydrolysis of chloroform or bromoform. This process and the resulting products are more fully described in our copending application, Serial Number 849,751, filed October 30, 1959, now U.S. 3,046,314. The alkaline conditions are provided by an alkali metal alkoxide such as sodium methoxide, potassium t-butoxide, potassium ethoxide and the like. More specifically, a 1-tolyl-2,2-dihalocyclopropane such as meta-methyl-1-(2,2-dichlorocyclopropyl) benzene is prepared as follows. A three liter 3-neck flask equipped with a stirrer, condenser and dropping funnel is charged with 3 moles (162 grams) sodium methoxide, 500 milliliters pentane as the reaction solvent, and 2.77 moles (354 grams) m-methylstyrene. Three moles (360 grams) of chloroform are added to the dropping funnel and 30 milliliters of chloroform are added to the flask. The mixture in the flask is heated to its boiling point and maintained under reflux conditions until the reaction is initiated. The heat source is removed and chloroform is added dropwise at a rate to maintain a gentle reflux, about three hours. After the addition of chloroform is complete, the resulting mixture is stirred at room temperature overnight. To the resulting mixture there are added 800 milliliters of water. The mixture is permitted to separate into two phases. The water phase is extracted with pentane. The pentane extracts and the organic layer are combined and dried over magnesium sulfate. The dried material is distilled to recover m-methyl-1-(2,2-dichlorocyclopropyl) benzene. Also, alkyl substituted α-methylstyrenes can be employed as reactants to prepare 1-(alkyl substituted phenyl)-1-methyl-2,2-dichlorocyclopropanes. The presence of the methyl group on the cyclopropyl ring does not provide a site for oxidative rupture of this ring.

For the purposes of this invention the ar-methyl substituted 1-aromatic 2,2-dihalocyclopropanes are of most interest. Ar-ethyl, ar-propyl, ar-isopropyl, etc. ar-alkyl feed stocks can be oxidized to aromatic carboxylic acid derivatives but require more oxygen and in the case of t-butyl derivatives require more severe oxidation conditions (i.e., higher temperature) to oxidize the t-butyl group. The carbons in excess of one in the alkyl group are mainly converted to carbon dioxide, and the extra hydrogens are converted to more water.

Air is the most readily available source of molecular oxygen. However, substantially pure oxygen; i.e., commercial oxygen, oxygen plus ozone, mixtures of oxygen and inert gas, and mixtures of air and inert gases can be employed as the source of molecular oxygen for the process of this invention. Molecular oxygen-containing gases having from 5% to 100% oxygen by volume can be employed.

In the practice of this invention the catalyst system comprises bromine and a heavy metal oxidation catalyst. The bromine may be employed as elemental, combined, or ionic bromine. More specifically, as a source of bromine for the catalyst system there may be employed molecular bromine, ammonium bromide, hydrogen bromide, and other bromine-containing compounds soluble in the reaction mixture. Satisfactory results can be obtained, for example, by the use of potassium bromate, tetra-bromoethane, benzyl bromide and the like as a source of bromine.

The heavy metal oxidation catalyst portion of the catalyst system employed in the process of this invention includes the heavy metals and derivatives thereof which are soluble in the reaction medium to the extent necessary to provide a catalytically effective amount of the heavy metal oxidation catalyst component. The term "heavy metal" is employed herein in the same sense as employed in connection with the metals shown in the "Periodic Chart of Elements," appearing on pages 56 and 57 of the "Handbook of Chemistry," 8th edition, published by Handbook Publishers, Inc., Sandusky, Ohio (1952). From this group there have been found heavy metal oxidation catalysts desirably applicable to the process of this invention for furnishing the heavy metal oxidation component of the catalyst system. Of the heavy metal group, those metals having an atomic number not greater than 84 have been found most useful. Excellent results are obtained by the utilization of metals having an atomic number of from 23 to 28 inclusive. Particularly excellent results are obtained with a metal of the group consisting of manganese, cobalt, nickel, iron, chromium, vanadium, molybdenum, tungsten, tin and cerium. The catalytic amount of the heavy metal may be provided either by a single metal or a combination of the metals. The heavy metal oxidation catalyst component of the catalyst system in the process of this invention may be provided by the addition of the metal in elemntal form, as its oxide or hydroxide, or in the form of a salt of the metal. For example, the metal manganese may be employed as the manganese salt of an organic carboxylic acid, such as manganese naphthenate, manganese toluate, manganese acetate, etc., or in the form of an organic complex, such as the acetylacetonate, the 8-hydroxyquinolate and the ethylene diamine tetra-acetate, as well as inorganic manganese salts such as the borates, halides and nitrates. The catalyst system may also be provided by the use of a heavy metal bromide or mixtures of heavy metal bromides.

The amount of metal catalyst employed is not critical and may be in the range of about 0.01 to about 10% by weight or more based on the feed stock reactant. Where the heavy metal is introduced as a bromide salt, for example as manganese bromide, the proportions of manganese and bromine will be in their stoichiometric proportions. The ratio of metal to bromine may be varied from such proportions within the range of about 1 to 10 atoms of heavy metal oxidation catalyst per atom of bromine to about 1 to 10 atoms of bromine per atom of heavy metal.

In order to facilitate a clear understanding of the invention, the process of this invention is illustrated by the following preferred embodiments described in detail.

*Example 1*

A mixture of 1-(3-methylphenyl)-2,2-dichlorocyclopropane (60%) and 1-(4-methylphenyl)2,2-dichlorocyclopropane (40%) is obtained by reacting a mixture containing 60% 3-methylstyrene and 40% 4-methylstyrene with dichlorocarbene in a process as hereinbefore described.

A suitable pressure reactor for oxidizing the above mixture of 1-tolyl-2,2-dichlorocyclopropanes is employed having a bottom air inlet and a products discharge, means for heating the reactor contents, a vapor conduit from the head portion of the reactor connected to a condenser, a conduit connected to the discharge end of the condenser and to a liquid-vapor separator, said separator being connected to a reactor through a condensate return conduit and to a gas vent line from its vapor space through a pressure regulating valve. To this reactor there are charged on a parts by weight basis:

| | Parts |
|---|---|
| Mixed 1-tolyl-2,2-dichlorocyclopropanes | 36.1 |
| Glacial acetic acid | 150 |
| Aqueous solution of which water is | 6.0 |
|    Cobalt acetate | 0.2 |
|    Manganese acetate | 0.4 |
|    Tetrabromethane | 0.2 |

The pressure regulating valve in the gas vent line is set at 400 p.s.i.g. and the reactor contents are heated to 350° F. (about 177° C.). Thereafter, air under pressure is passed into the liquid reaction mixture at 0.13 cubic foot per minute (corrected to standard temperature and pressure). The liquid reaction mixture occupies about one-half the reactor volume before air is introduced. External heating is not required, for the exothermic reaction maintains the reaction temperature at 350° F. Reaction pressure is maintained at 400 p.s.i.g. to insure a liquid phase of acetic acid containing the catalyst, reactants and reaction products. After about 4–5 hours the air is shut off, the reactor contents are cooled to about 100° F. and discharged from the reactor and collected. The mixture discharged from the reactor contains a solid (I) which is recovered by filtration. The filtrate (II) is collected.

The above solid is dissolved in hot aqueous potassium hydroxide, the resulting solution is filtered and acidified with hydrochloric acid. A preciiptate forms. This precipitate is recovered, dissolved in 95% ethanol and recrystallized therefrom, washed with cold (60° F.) pentane and dried. The recrystallized product melts at 186 to 190° C. From an analytical inspection of the recrystallized product the following were found to be in close agreement with the corresponding calculated value for a (2,2-dichlorocyclopropyl)-benzoic acid ($C_{10}H_8Cl_2O_2$):

| | By Analysis | Calculated |
|---|---|---|
| Neutral equivalent | 227 | 231 |
| Carbon percent | 52.0 | 51.9 |
| Hydrogen do | 3.91 | 3.46 |
| Chlorine do | 30.7 | 30.7 |
| Oxygen do | 13.5 | 13.9 |

This product is mainly p-(2,2-dichlorocyclopropyl)benzoic acid.

The reaction mixture filtrate (II) is evaporated to a tarry residue. This residue is taken up in hot aqueous potassium hydroxide and the resulting solution is filtered. The filtrate is cooled to about 75° F. and acidified with hydrochloric acid. A dark-yellow gum precipitates from solution. This yellow gum is dissolved in hot naphtha. The naphtha solution is filtered and cooled. A fine yellow solid precipitates. This fine yellow solid is recrystallized from hexane and dried. The dry recrystallized product has a melting point of 111 to 114° C. Its neutralization equivalent, and carbon, hydrogen, chlorine and oxygen are determined by analysis and compare closely with the same calculated values for (2,2-dichlorocyclopropyl)-benzoic acid as is seen from the following:

|  | By Analysis | Calculated |
|---|---|---|
| Neutral equivalent | 225 | 231 |
| Carbon_____percent__ | 51.9 | 51.9 |
| Hydrogen_____do____ | 3.33 | 3.46 |
| Chlorine_____do____ | 31.4 | 30.7 |
| Oxygen_____do____ | 14.8 | 13.9 |

This product is mainly m-(2,2-dichlorocyclopropyl)-benzoic acid.

Example 2

By substituting 1-(p-tolyl)-2,2-dichlorocyclopropane for the mixture of 1-tolyl-2,2-dichlorocyclopropane isomers employed in the process of Example 1 and repeating the process of Example 1, there is obtained p-(2,2-dichlorocyclopropyl) benzoic acid. This product and the product recovered from the solid (I) in Example 1 are identical.

Example 3

The process of Example 1 is repeated except 50 parts by weight 1-methyl-1-p-cumyl-2,2-dichlorocyclopropane is employed in place of the 36.1 parts of 1-tolyl-2,2-dichlorocyclopropanes. There is recovered from this oxidation process p-(1-methyl-2,2-dichlorocyclopropyl) benzoic acid.

Similarly, 1-(2,2-dichlorocyclopropyl)-4-tertiary butyl-2,6-dimethylbenzene may be oxidized to 1-(2,2-dichlorocyclopropyl)-4-tertiary butyl-2,6-benzene dicarboxylic acid; 1-(2,2-dibromocyclopropyl)-3,5 - dimethylbenzene may be oxidized to 1-(2,2-dibromocyclopropyl)-3,5-benzene dicarboxylic acid; 4-methyl-4'-(2,2-dibromocyclopropyl) biphenyl may be oxidized to 4'-(2,2-dibromocyclopropyl)4-biphenyl carboxylic acid; 1-(2,2-dichlorocyclopropyl)-5-methylnaphthalene may be oxidized to 1-(2,2-dichlorocyclopropyl)-5-naphthalene carboxylic acid and 1-(2,2-dichlorocyclopropyl) acenaphthene may be oxidized to 1-(2,2-dichlorocyclopropyl)-4,5-naphthalene dicarboxylic acid.

As for the process described in U.S. Patent 2,833,816, any of the aforementioned sources of bromine or of the heavy metal oxidation catalysts may be employed in the oxidation process of this invention.

From the foregoing, it is readily apparent that the cyclopropyl ring is unaffected by the oxidation process of this invention. After formation of the acid, the dihalocyclopropyl group can be opened up with a strong acid as, for example, by treatment with sulfuric acid or hydrogen bromide. A difunctional compound will result containing COOH groups and an olefin group. The acids may be converted to esters such as, for example, the alkyl esters: methyl, ethyl, propyl, isopropyl, butyl, tertiary butyl, 2-ethylhexyl, and the like; or the alkenyl esters such as a vinyl ester or allyl ester. The alkenyl esters may be polymerized by free radical formers or by acids or bases as a homopolymer or with such copolymerizable monomers as styrene, isoprene, chloroprene, butadiene, vinyl chloride, vinylidene chloride, vinylidene cyanide, vinyl acetate, acrylonitrile, methyl acrylate, ethyl acrylate, methyl methacrylate, and the like. Even in these polymers and copolymers the cyclopropane ring can be opened readily to impart additional functionality and give rise to a wide variety of new polymers. The alkyl esters can be employed as plasticizers and, because of their halogen content, will impart flame-retarding properties to the resulting plasticized products.

Other ar-alkyl substituted 1-aryl-2,2-dihalocyclopropanes can be oxidized by the process of this invention to ar-carboxy 1-aryl-2,2-dihalocyclopropanes. For example, 1-(mono - ethylphenyl), 1-(mono-n-propylphenyl), 1-(mono-isopropyl) etc. dihalocyclopropanes can be oxidized to 2,2-dihalocyclopropyl benzoic acids. The presence of a methyl group of the cyclopropane group, such as derived from an alpha-methyl vinyl aromatic, is not affected by the oxidation. Hence, 1-methyl-2,2-dihalocyclopropyl aromatic carboxylic acids can also be prepared by the process of this invention as has been illustrated. Alkyl groups attached to the aromatic ring ortho to the dihalocyclopropyl group may also be oxidized to carboxylic acid groups. Thus, the process of this invention is not limited to utilization of specific ar-alkyl position isomers. Also, ar-dialkyl dihalocyclopropyl, ar-trialkyl dihalocyclopropyl, ar-tetra-alkyl dihalocyclopropyl, etc. -benzene, -biphenyls, -naphthalenes, and the like may be oxidized to the corresponding dihalocyclopropyl aromatic di-, tri-, tetra-carboxylic acids. Furthermore, the new aromatic acids of this invention also include those having two 2,2-dichlorocyclo or 2,2-dibromocyclopropyl groups as in 2,5-di-(2,2-dichlorocyclopropyl) benzoic acid, 2,5-di-(2,2-dibromocyclopropyl) benzoic acid, 2,5-di-(1-methyl-2,2-dichlorocyclopropyl) benzoic acid, etc.

The process of this invention is unique in an additional aspect in that the 2,2-dichloro- or 2,2-dibromo-cyclopropane ring is not opened during the oxidation even though glacial acetic acid is present and the reaction temperature is above the normal boiling point of glacial acetic acid. In the absence of the other conditions for oxidation the cyclopropane ring would be opened. Why it is not in the oxidation reaction is not known.

For low pressure oxidation; i.e., down to atmospheric pressure, benzoic acid and mixtures thereof with the higher members of the 2 to 8 carbon atom aliphatic acids such as hexanoic, heptanoic and octanoic acids can be employed as the reaction medium. The admixture of the $C_6$ to $C_8$ aliphatic acids with benzoic acid provides a medium which is fluid at temperatures at which the resulting reaction mixture can be handled. Any benzoic acid associated with the desired product can be readily removed by leaching the product with water.

The new class of aromatic acids, therefore, are aromatic carboxylic acids containing at least one and up to four carboxyl groups and at least one and up to two dibromo- or dichloro-cyclopropyl groups. These compounds can be represented by the following general formula:

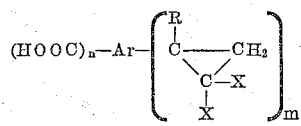

wherein Ar is an aromatic hydrocarbon group such as derived from benzene, naphthalene, biphenyl by the replacement of hydrogens on the ring carbon atoms with carboxyl groups and the

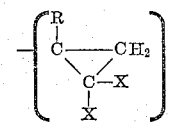

groups and wherein R is hydrogen or methyl, X is bromine or chlorine, n is a number from 1 to 4 inclusive and m is a number from 1 to 2 inclusive.

What is claimed is:

1. A 1-(2,2-dihalocyclopropyl) aromatic carboxylic acid having the formula

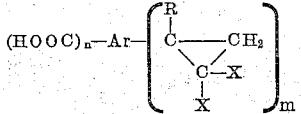

wherein Ar is an aromatic hydrocarbon group, n is a number from 1 to 4 inclusive, m is a number from 1 to 2 inclusive and wherein R is selected from the class consisting of hydrogen and a methyl group and X is selected from the class consisting of bromine and chlorine.

2. A benzoic acid having the formula:

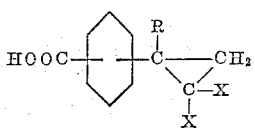

wherein R is selected from the group consisting of hydrogen and a methyl group and X is selected from the group consisting of bromine and chlorine.

3. p-(2,2-dichlorocyclopropyl) benzoic acid.
4. m-(2,2-dichlorocyclopropyl) benzoic acid.

References Cited in the file of this patent
UNITED STATES PATENTS
2,833,816    Saffer et al. _____ May 6, 1958

OTHER REFERENCES
Burney et al.: "Petroleum Refiner," volume 38, No. 6, pages 186–188, June 1959.